(12) United States Patent
Kim et al.

(10) Patent No.: US 9,383,489 B2
(45) Date of Patent: Jul. 5, 2016

(54) INKJET COMPOSITION FOR FORMING TRANSPARENT FILM AND PREPARATION METHOD THEREOF

(75) Inventors: Mun-Ho Kim, Daejeon (KR); Seung-Hee Lee, Seoul (KR); Han-Soo Kim, Daejeon (KR); Mi-Kyoung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 134 days.

(21) Appl. No.: 13/502,325

(22) PCT Filed: Oct. 22, 2010

(86) PCT No.: PCT/KR2010/007298
§ 371 (c)(1),
(2), (4) Date: Apr. 16, 2012

(87) PCT Pub. No.: WO2011/052934
PCT Pub. Date: May 5, 2011

(65) Prior Publication Data
US 2012/0208930 A1     Aug. 16, 2012

(30) Foreign Application Priority Data

Oct. 26, 2009 (KR) .................. 10-2009-0101849
Oct. 20, 2010 (KR) .................. 10-2010-0102501

(51) Int. Cl.
| | | |
|---|---|---|
| *C09D 163/00* | (2006.01) | |
| *C09D 11/30* | (2014.01) | |
| *C08K 5/3492* | (2006.01) | |
| *C07D 251/48* | (2006.01) | |
| *C07D 251/54* | (2006.01) | |
| *G02B 1/10* | (2015.01) | |
| *G02B 5/22* | (2006.01) | |
| *C09D 133/06* | (2006.01) | |
| *C08G 59/32* | (2006.01) | |
| *C09D 11/102* | (2014.01) | |
| *G02B 5/20* | (2006.01) | |

(52) U.S. Cl.
CPC ............ *G02B 5/223* (2013.01); *C08G 59/3209* (2013.01); *C09D 11/102* (2013.01); *C09D 11/30* (2013.01); *C09D 133/068* (2013.01); *C09D 163/00* (2013.01); *G02B 5/201* (2013.01)

(58) Field of Classification Search
CPC .................................................. C08G 59/5086
USPC ............................................................ 525/110
See application file for complete search history.

(56) References Cited

U.S. PATENT DOCUMENTS

| | | | | |
|---|---|---|---|---|
| 3,198,850 | A * | 8/1965 | Levantin | ........................ 523/400 |
| 4,237,241 | A * | 12/1980 | Chattha | ........................ 525/110 |
| 6,322,620 | B1 | 11/2001 | Xiao | |
| 7,328,988 | B2 * | 2/2008 | Kim et al. | ...................... 347/100 |
| 2007/0182795 | A1 * | 8/2007 | Kim et al. | ...................... 347/100 |
| 2007/0182975 | A1 | 8/2007 | Adams | |
| 2007/0225402 | A1 | 9/2007 | Choi et al. | |
| 2008/0206488 | A1 | 8/2008 | Chung et al. | |

FOREIGN PATENT DOCUMENTS

| | | | | |
|---|---|---|---|---|
| EP | 00529595 A1 * | 6/1981 | ............... | C09D 3/81 |
| EP | 0 914 961 A1 | 5/1999 | | |
| JP | 07-196968 A | 8/1995 | | |
| JP | 2000239497 A * | 9/2000 | ............... | C08L 63/00 |
| JP | 2009-074010 A | 4/2009 | | |
| JP | 2009-237225 A | 10/2009 | | |
| KR | 10-0727434 B | 6/2007 | | |
| KR | 10-0744351 B1 | 7/2007 | | |
| KR | 10-2007-0107442 A | 11/2007 | | |

OTHER PUBLICATIONS

Machine translation of JP 2009-074010.*
Scifinder Properties of 2-(2-butoxyethoxy)ethyl acetate.*
Scifinder properties of butyl cellosolve (2014).*
Machine translation of JP 2000-239497.*

* cited by examiner

*Primary Examiner* — Mark Kaucher
*Assistant Examiner* — Kregg Brooks
(74) *Attorney, Agent, or Firm* — Dentons US LLP

(57) ABSTRACT

The present invention relates to an inkjet composition for forming transparent films, which is highly economical and environmentally friendly and has excellent physical properties, including excellent transmittance, chemical resistance, heat resistance, adhesion, jetting stability and storage stability.

12 Claims, No Drawings

INKJET COMPOSITION FOR FORMING TRANSPARENT FILM AND PREPARATION METHOD THEREOF

This application is a National Stage Entry of International Application No. PCT/KR2010/007298, filed Oct. 22, 2010, and claims the benefit of Korean Application Nos. 10-2009-0101849, filed on Oct. 26, 2009, and 10-2010-0102501, filed on Oct. 20, 2010, which are hereby incorporated by reference for all purposes as if fully set forth herein.

TECHNICAL FIELD

The present invention relates to an inkjet composition for forming transparent films and a preparation method thereof, and more particularly, to an inkjet composition for forming transparent films, which is used as an overcoat material in a process of manufacturing liquid crystal displays and is capable of forming a transparent ink thin film using an inkjet process.

BACKGROUND ART

In processes of manufacturing color filters or various interconnections for liquid crystal displays, organic EL displays, plasma displays and the like, an inkjet process is being widely used.

The inkjet process is a method in which a liquid material is printed on a substrate according to a predetermined pattern and then dried, thereby forming a desired thin film. Accordingly, the inkjet process uses a smaller amount of material than other conventional processes, and thus is known as a very economical and environmentally friendly process.

A transparent coating solution has been frequently used as an overcoat material in a process of manufacturing liquid crystal displays. The overcoat process serves to cover the lower layer of a display substrate so as to maintain the height of the lower layer at a uniform level and also serves to protect the lower layer from heat or chemicals.

Furthermore, the transparent coating solution should ensure that the properties of the transparent film formed therefrom do not change during a post-treatment process, because it can undergo post-treatment after use in a specific process, as well as a final process.

Currently, in the manufacturing of liquid crystal displays, a transparent coating solution for an overcoat layer is applied to the entire area of the lower layer of a substrate to a uniform thickness by means of a spin coater or a slit coater. In recent years, the transparent coating solution has been used in a wide range of applications, for example, it is used as white ink in an RGB plus white system obtained by adding a white layer to a three color (RGB) filter system in order to increase the brightness of a device.

Accordingly, the development of a transparent coating solution applicable to an inkjet process which allows a transparent coating layer to be formed at a desired position with a small amount of ink and which enables the thickness of an overcoat layer to be changed depending on the thickness of the underlying layer is required.

DISCLOSURE

Technical Problem

Therefore, an aspect of the present invention provides an inkjet composition for forming transparent films, which has excellent transmittance, chemical resistance, heat resistance, adhesion, jetting stability and storage stability, and particularly, an inkjet composition for forming transparent films, which can be used as an overcoat material for electronic devices due to its excellent jetting properties and can be used as a white (W) pattern in color filters.

Another aspect of the present invention provides a method for preparing the inkjet composition.

Another aspect of the present invention provides a transparent film formed using the inkjet composition.

Another aspect of the present invention provides a method for manufacturing the transparent film.

Another aspect of the present invention provides an electronic device including the transparent film as an overcoat.

Another aspect of the present invention provides a color filter including the transparent film as a white pattern.

Technical Solution

In accordance with one aspect of the present invention, there is provided an inkjet composition for forming transparent films, which includes: (a) an epoxy group-containing binder polymer; (b) a melamine compound of the following formula 1; and (c) a solvent:

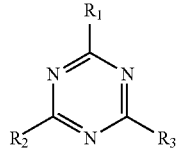

[Formula 1]

wherein at least two of $R_1$, $R_2$ and $R_3$ are amine groups, the remainder of $R_1$, $R_2$ and $R_3$ is hydrogen, wherein the amine groups may be each independently substituted with substituents selected from the group consisting of a $C_1$-$C_{30}$ linear or branched alkyl, a $C_1$-$C_{30}$ linear or branched alkoxy, a $C_3$-$C_{30}$ linear or branched allyl, a $C_2$-$C_{30}$ linear or branched alkenyl, a $C_2$-$C_{30}$ linear or branched vinyl, a carboxyl group (COO—), an ether group (—CH$_2$OR), an alcohol group (—CH$_2$OH), a substituted or unsubstituted $C_3$-$C_{20}$ cycloalkyl, a substituted or unsubstituted $C_6$-$C_{40}$ aryl, a substituted or unsubstituted $C_7$-$C_{15}$ aralkyl, and a $C_7$-$C_{15}$ alkylaryl substituted or unsubstituted with hydrocarbon, and when the substituents of the amine groups are substituted with different substituents, the different substituents may be selected from the group consisting of a $C_1$-$C_{30}$ alkyl group, a $C_6$-$C_{40}$ aryl group, a $C_3$-$C_{40}$ heterocyclic group, and a halogen group.

The compound of formula 1 may be a compound of the following formula 2:

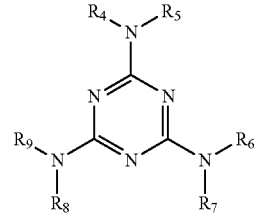

[Formula 2]

wherein $R_4$ to $R_9$ are each independently selected from the group consisting of a $C_1$-$C_{30}$ linear or branched alkyl, a $C_1$-$C_{30}$ linear or branched alkoxy, a $C_3$-$C_{30}$ linear or branched allyl, a $C_2$-$C_{30}$ linear or branched alkenyl, a $C_2$-$C_{30}$ linear or branched vinyl, a carboxyl group (COO—), an ether group (—$CH_2OR$), an alcohol group (—$CH_2OH$), a substituted or unsubstituted $C_3$-$C_{20}$ cycloalkyl, a substituted or unsubstituted $C_6$-$C_{40}$ aryl, a substituted or unsubstituted $C_7$-$C_{15}$ aralkyl, and a $C_7$-$C_{15}$ alkylaryl substituted or unsubstituted with hydrocarbon, and when $R_4$ to $R_9$ are substituted with different substituents, the substituents may be selected from the group consisting of a $C_1$-$C_{30}$ alkyl group, a $C_6$-$C_{40}$ aryl group, a $C_3$-$C_{40}$ heterocyclic group, and a halogen group.

The inkjet composition for forming transparent films may include, based on the total weight of the composition, 1-40 wt % of the epoxy group-containing binder polymer (a), 1-40 wt % of the melamine compound of formula 1 (b), and 40-90 wt % of the solvent (c).

The inkjet composition may have a three-dimensional network structure.

The inkjet composition for forming transparent films may be used for an inkjet process.

The epoxy group-containing binder polymer (a) may be a copolymer of a monomer having an epoxy group with at least one selected from the group consisting of an acrylic monomer having an epoxy group, an acrylic monomer having an ethylenic double bond at the side chain, a (meth)acrylic ester monomer, a styrene monomer, and a silane monomer having an ethylenic unsaturated bond.

The content of the monomer, having the epoxy group, in the copolymer, may be 5-50 wt % based on the total weight of the copolymer.

The weight-average molecular weight of the epoxy group-containing binder polymer (a) may be 1,000-100,000.

The solvent (c) may have a boiling point of 150~250° C.

The inkjet composition for forming transparent films may have a viscosity of 8-16 cP.

The weight ratio of the epoxy group-containing binder polymer (a) to the melamine compound of formula 1 (b) may be 1:0.5 to 1:2.

The present invention also provides a method for preparing an inkjet composition for forming transparent films, the method including mixing (a) a binder polymer containing an epoxy group, (b) a melamine compound of the above formula 1 and (c) a solvent.

The present invention also provides a transparent film formed using the inkjet composition for forming transparent films.

The transparent film may have a light transmittance of 98% or higher at 380-780 nm after curing.

The present invention also provides a method for manufacturing a transparent film, the method including forming the transparent film with the inkjet composition using an inkjet process.

The present invention also provides an electronic device including the transparent film as an overcoat.

The present invention also provides a color filter including the transparent film as a white pattern.

Advantageous Effects

As described above, the inkjet composition for forming transparent films according to the present invention allows a transparent film to be formed at a desired position with a small amount of ink using an inkjet process, and thus can increase the efficiency of the process. Also, it has excellent jetting properties, and thus is advantageous for the formation of a transparent film. In addition, it can have excellent transmittance, chemical resistance, heat resistance, adhesion, jetting stability and storage stability.

BEST MODE

Hereinafter, the present invention will be described in further detail.

The present invention provides an inkjet composition for forming transparent films, which includes: (a) an epoxy group-containing binder polymer; (b) a melamine compound of the following formula 1; and (c) a solvent:

[Formula 1]

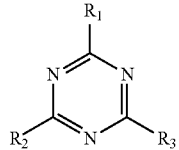

wherein at least two of $R_1$, $R_2$ and $R_3$ are amine groups, the remainder of $R_1$, $R_2$ and $R_3$ is hydrogen, wherein the amine groups may be each independently substituted with substituents selected from the group consisting of a $C_1$-$C_{30}$ linear or branched alkyl, a $C_1$-$C_{30}$ linear or branched alkoxy, a $C_3$-$C_{30}$ linear or branched allyl, a $C_2$-$C_{30}$ linear or branched alkenyl, a $C_2$-$C_{30}$ linear or branched vinyl, a carboxyl group (COO—), an ether group (—$CH_2OR$), an alcohol group (—$CH_2OH$), a substituted or unsubstituted $C_2$-$C_{20}$ cycloalkyl, a substituted or unsubstituted $C_6$-$C_{40}$ aryl, a substituted or unsubstituted $C_7$-$C_{15}$ aralkyl, and a $C_7$-$C_{15}$ alkylaryl substituted or unsubstituted with hydrocarbon, and when the substituents of the amine groups are substituted with different substituents, the different substituents may be selected from the group consisting of a $C_1$-$C_{30}$ alkyl group, a $C_6$-$C_{40}$ aryl group, a $C_3$-$C_{40}$ heterocyclic group, and a halogen group.

The melamine compound of formula 1 can serve as a crosslinker to impart suitable viscosity to the inkjet composition for forming transparent films, because 2 or 3 functional amine groups at the end of the melamine compound react with the epoxy group of the epoxy group-containing binder polymer (a).

Also, the melamine compound has low molecular weight and low viscosity compared to dipentaerythritol hexaacrylate (DPHA) monomer which has been used in conventional inkjet compositions for forming transparent films. Thus, it can be used in an increased amount, so that the solid content of the inkjet composition for forming transparent films can be increased, thereby reducing the number of ink drops in a coating process such as an inkjet process.

Furthermore, the inkjet composition for forming transparent films, which contains the melamine compound, undergoes a condensation-type thermosetting process rather than a chain-polymerization process that forms carbon-carbon bonds, and thus can improve the mechanical and thermal durability of the transparent coating film.

In one preferred embodiment, the compound of formula 1 may be represented by the following formula 2:

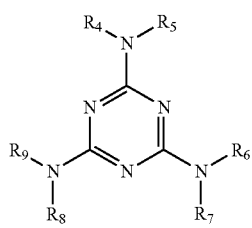

[Formula 2]

wherein $R_4$ to $R_9$ are each independently selected from the group consisting of a $C_1$-$C_{30}$ linear or branched alkyl, a $C_1$-$C_{30}$ linear or branched alkoxy, a $C_3$-$C_{30}$ linear or branched allyl, a $C_2$-$C_{30}$ linear or branched alkenyl, a $C_2$-$C_{30}$ linear or branched vinyl, a carboxyl group (COO—), an ether group (—CH$_2$OR), an alcohol group (—CH$_2$OH), a substituted or unsubstituted $C_3$-$C_{20}$ cycloalkyl, a substituted or unsubstituted $C_6$-$C_{40}$ aryl, a substituted or unsubstituted $C_7$-$C_{15}$ aralkyl, and a $C_7$-$C_{15}$ alkylaryl substituted or unsubstituted with hydrocarbon, and when $R_4$ to $R_9$ are substituted with different substituents, the substituents may be selected from the group consisting of a $C_1$-$C_{30}$ alkyl group, a $C_6$-$C_{40}$ aryl group, a $C_3$-$C_{40}$ heterocyclic group, and a halogen group.

In the present invention, the $C_1$-$C_{30}$ alkyl group may be one or more selected from the group consisting of methyl, ethyl, propyl, isopropyl, butyl, tert-butyl, pentyl, hexyl and heptyl groups.

The $C_1$-$C_{30}$ linear or branched alkoxy group may be one or more selected from the group consisting of —OCH$_3$, —OCH$_2$CH$_3$, —OCH$_2$CH$_2$CH$_3$, and —OCH$_2$CH$_2$CH$_3$.

The $C_6$-$C_{40}$ aryl group may be one or more selected from the group consisting of phenyl, naphthyl, anthracenyl, biphenyl, pyrenyl and perylenyl groups.

The $C_3$-$C_{40}$ heterocyclic group may be one or more selected from the group consisting of pyridyl, bipyridyl, acridinyl, thienyl, imidazolyl, oxazolyl, thiazolyl and quinolyl groups.

The halogen group may be one or more selected from the group consisting of fluorine, chlorine, bromine and iodine.

The $C_2$-$C_{30}$ linear or branched vinyl may comprise, for example, an acrylic group.

The inkjet composition for forming transparent films may include, based on the total weight of the composition, 1-40 wt % of the epoxy group-containing binder polymer (a), 1-40 wt % of the melamine compound of formula 1 (b), and 40-90 wt % of the solvent (c).

If the content of the binder polymer containing the epoxy group is less than 1 wt %, the strength of the resulting transparent film can be reduced, and if the content is more than 40 wt %, the viscosity of the inkjet composition can be increased, thus significantly deteriorating the jetting properties of the composition. If the content of the melamine compound is less than 1 wt %, the heat resistance and strength of the transparent film can be reduced due to insufficient crosslinking, and if the content is more than 40 wt %, unreacted monomers can be modified during a curing process or an additional heat-treatment process, thus reducing the transmittance of the transparent film.

Meanwhile, the inkjet composition has a three-dimensional network structure. By the three-dimensional network structure, the resulting ink film becomes very strong, and thus has improved properties, including improved chemical resistance and abrasion resistance.

Although the inkjet composition for forming transparent films can be applied using a general coating process such as spin coating or slit coating, it may be used for an inkjet process which is highly economical, environmentally friendly and efficient.

The epoxy group-containing binder polymer (a) is not specifically limited, as long as it does not deteriorate the performance of the inkjet composition and can increase the adhesion of the inkjet composition to the surface of a substrate. The epoxy group-containing binder polymer that is used in the present invention may be a copolymer of a monomer having an epoxy group with at least one selected from the group consisting of an acrylic monomer having an epoxy group, an acrylic monomer having an ethylenic double bond at the side chain, a (meth)acrylic ester monomer, a styrene monomer, and a silane monomer having an ethylenic unsaturated bond.

In this case, the copolymer may contain the monomer, having the epoxy group, in an amount of 5-50 wt % based on the total weight of the copolymer. If the content of the monomer having the epoxy group is less than 5 wt %, the ink film will not be sufficiently crosslinked, and thus the strength thereof can be reduced, and if the content is more than 50 wt %, the reactivity of the composition will be somewhat increased, thus reducing the storage stability thereof.

The epoxy group-containing monomer contained in the epoxy group-containing binder polymer (a) binds with the amine group of the melamine compound, thereby imparting suitable viscosity to the inkjet composition and improving the storage stability of the inkjet composition.

The epoxy group-containing binder polymer (a) may have a weight-average molecular weight of 1,000-100,000. If the weight-average molecular weight is more than 100,000, the solubility thereof in a solvent will be reduced or the viscosity of the inkjet composition will be excessively increased, and if it is less than 1,000, the physical properties of the resulting transparent coating layer will be deteriorated.

The solvent that is used in the present invention may be a low-volatility, high-boiling-point solvent. For example, a high-boiling-point solvent having a boiling point of 150~250° C. may be used.

Also, the solvent that is used in the present invention may be one or more selected from the group consisting of, for example, ethylene glycol monobutyl ether acetate, diethylene glycol monobutyl ether acetate, diethylene glycol butyl ether, diethylene glycol monoethyl ether acetate, dipropylene glycol methyl ether acetate, methoxy ethanol, ethoxy ethanol, butoxy ethanol, butoxy propanol, ethoxy ethyl acetate, butoxy acetate, and butoxy ethyl acetate.

In addition, the inkjet composition of the present invention may contain at least one additive selected from the group consisting of a surfactant, an adhesive agent for enhancing adhesion to a substrate, an adhesion promoter, a curing accelerator, a heat polymerization inhibitor, a dispersing agent, a plasticizer, a filler, a defoaming agent, a dispersion aid and an anticoagulant. Meanwhile, the inkjet composition of the present invention does not contain any pigment, because it is intended to form a transparent film. Also, the inkjet composition of the present invention does not need to contain any initiator.

The above additive is added in an amount of 0.01-0.5 wt %, and preferably 0.1-0.5 wt %, based on the total weight of the inkjet composition.

The viscosity of the inkjet composition is 8-16 cP, and preferably 11-13 cP, such that the composition ensures jetting stability and can be easily applied to an inkjet process. If the viscosity of the inkjet composition for forming transparent films is less than 8 cP or more than 16 cP, the jetting stability of the composition can be reduced.

The melamine compound in the inkjet composition of the present invention has a low molecular weight and low viscosity, and thus can be used in an increased amount. Accordingly, it can increase the solid content of the inkjet composition, thus reducing the number of ink drops during an inkjet process. In addition, because it undergoes a condensation-type thermosetting process rather than a chain polymerization process that forms carbon-carbon double binds, it increases the mechanical and thermal durability of the resulting transparent film.

Because the inkjet composition of the present invention contains neither a pigment nor a coloring agent, the binder polymer (a) and the melamine compound (b) account for most of the solid content of the composition. Because the pigment and the coloring agent have a relatively high viscosity, a color ink composition containing the pigment and the coloring agent has a shortcoming in that the solid content thereof cannot exceed a specific level, because the viscosity thereof should be limited for stable jetting. However, the inkjet composition of the present invention may have relatively low viscosity, and thus can provide an ink having a relatively high solid content. In addition, the contents of the binder polymer and the melamine compound in the inkjet composition of the present invention can be increased compared to those in conventional color ink compositions, and the ratio of the contents of the two components can also be easily controlled.

The solid content of the binder polymer (a) and melamine compound (b) may be 95-99 wt % based on the total solid content of the inkjet composition. If the solid content is less than 95 wt %, the transmittance of the resulting film can be reduced, or the composition can generate fumes during a curing process or a post-treatment process, thus causing contamination, and if the solid content is more than 99 wt %, the coating property of the ink film and the adhesion thereof to a substrate can be deteriorated.

Accordingly, in consideration of excellent transmittance and chemical resistance, the weight ratio of the binder polymer (a) to the melamine compound (b) is 1:2 or less, and preferably 1:0.5 to 1:1. If, in the weight ratio of the epoxy group-containing binder polymer to the melamine compound, the melamine compound is more than 1:2, the ratio of the melamine compound in the inkjet composition will be excessively high, melamine will be lost as fumes during the curing of the coating film formed of the inkjet composition. Meanwhile, if, in the weight ratio of the epoxy group-containing binder polymer to the melamine compound of formula 1, the epoxy group-containing binder polymer is more than 1:0.5, the content of the high-viscosity binder polymer in the inkjet composition will be high, and thus the viscosity of the composition will be increased when it maintains solid content. Thus, the jetting property can be reduced, and the heat resistance and strength of the transparent film can be reduced due to insufficient crosslinking.

As described above, the inkjet composition for forming transparent films according to the present invention can be easily adjusted to a viscosity level required for its use in an inkjet process. Thus, it may contain various binders, polymerizable monomers or other additives according to the intended use thereof without regard to adjustment of viscosity. Also, the contents of these additives can be easily adjusted. In addition, the inkjet composition of the present invention has excellent transmittance, and thus can be easily used in applications requiring transmittance.

The present invention also provides a method for preparing an inkjet composition for forming transparent films, the method including mixing (a) an epoxy group-containing binder polymer, (b) a melamine compound of the following formula 1, and (c) a solvent:

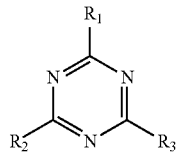

[Formula 1]

wherein $R_1$, $R_2$ and $R_3$ are as defined above.

The epoxy group-containing binder polymer (a), the melamine compound of formula 1 (b) and the solvent (c), which are used in the method for preparing the inkjet composition for forming transparent films, have been described in detail above, and thus the detailed description thereof will not be repeated.

The present invention also provides a transparent film formed using the above-described inventive inkjet composition for forming transparent films. The transparent film of the present invention may have a light transmittance of 98% or more at 380-780 nm after curing.

The present invention also provides a method for manufacturing a transparent film, the method including forming the transparent film using the above-described inkjet composition of the present invention.

The present invention also provides an electronic device including the transparent film as an overcoat. The electronic device may be, but is not limited to, a color filter device for, for example, LCD displays.

Furthermore, the present invention provides a color filter including the transparent film as a white pattern. The color filter may be manufactured by: forming a black matrix pattern on a substrate according to a conventional method known in the art and curing the formed black matrix pattern, thereby manufacturing shielding units of the light and pixel units defined by the black matrix pattern on the substrate; filling the pixel units defined by the black matrix pattern, with the inkjet composition of the present invention, using an inkjet process; and curing the filled inkjet composition.

The substrate that is used in the present invention may be selected from among, but not limited to, glass substrates, plastic substrates and other flexible substrates. A transparent glass substrate having high heat resistance may be used.

The inkjet process is a method of discharging ink drops into the pixel units, defined by the black matrix pattern, in a non-contact way using an ink nozzle.

When a thermal initiator is used, the filled inkjet composition for forming transparent films may be pre-baked at 50~120° C. and then post-baked at 220~280° C. If the heat-curing temperature is lower than 220° C., the evaporation of the solvent and heat curing will be insufficient, and thus the strength and chemical resistance of the film can be reduced, and if it is higher than 280° C., the volume of the pixel units can be excessively shrunk, thus causing problems associated with accuracy and the adhesion of the film to a substrate, and the formed film can also be damaged by heat.

When a photoinitiator is used, the filled inkjet composition may be cured at an exposure dose of 40-300 mJ/cm². If the exposure dose is less than 40 mJ/cm², photocuring will be insufficient, and thus the strength and chemical resistance of the film can be reduced, and if it is more than 300 mJ/cm², the time taken for the exposure process can be increased, thus causing problems in terms of tact time. The ink film resulting from the exposure process may be additionally cured in an oven at 180~230° C.

MODE FOR INVENTION

Hereinafter, the present invention will be described in further detail with reference to examples. It is to be understood, however, that these examples are for illustrative purposes only and are not to be construed to limit the scope of the present invention.

Example 1

An inkjet composition for forming transparent films was prepared by mixing the following components for 3 hours: 12.1 g of a copolymer, as a binder polymer, consisting of benzyl acrylate, benzyl methacrylate, hydroxy ethyl methacrylate and glycidyl methacrylate (GMA) monomers (molar ratio=30:45:20:5); 11.3 g of a hexamethoxymethyl melamine compound (Cymel 303); and 76.6 g of diethylene glycol monobutyl ether acetate as a solvent.

Example 2

An inkjet composition for forming transparent films was prepared by mixing the following components for 3 hours: 12.5 g of a copolymer, as a binder polymer, consisting of tetrahydropyranyl methacrylate, styrene, methacryloxypropyl trimethoxysilane and glycidyl methacrylate (GMA) monomers (molar ratio=10:50:40:30); 11.6 g of a hexamethoxymethyl melamine compound (Cymel 303); and 75.9 g of diethylene glycol monobutyl ether acetate as a solvent.

Comparative Example 1

An inkjet composition for forming transparent films was prepared by mixing the following components for 3 hours: 10 g of a copolymer, as a binder polymer, consisting of benzyl acrylate, methacrylate and methacrylic acid monomers (molar ratio: 60:10:30); 16 g of dipentaerythritol hexaacrylate (DPHA) as a polymerizable monomer; 0.5 g of a thermal initiator; and 73.5 g of diethylene glycol monobutyl ether acetate as a solvent.

Comparative Example 2

A inkjet composition for forming transparent films was prepared in the same manner as Example 2, except that propylene glycol monomethyl ether acetate (boiling point 146° C.) was used as the solvent.

Comparative Example 3

An inkjet composition for forming transparent films was prepared by mixing the following components for 3 hours: 17.6 g of a copolymer, as a binder polymer, consisting of tetrahydropyranyl methacrylate, styrene, methacryloxypropyl trimethoxysilane and glycidyl methacrylate (GMA) monomers (molar ratio=10:50:40:30); 7.0 g of a hexamethoxymethyl melamine compound (Cymel 303); 75 g of diethylene glycol monobutyl ether acetate as a solvent; and 0.4 g of additives (a surfactant and an adhesion enhancer).

Test Example 1

Manufacture of Transparent Film

Each of the inkjet compositions, prepared in Examples 1 and 2 and Comparative Examples 1 and 2, was spin-coated on a glass substrate and pre-baked at 90° C. for 3 minutes, followed by post-baking in an IR oven (260~270° C.) for about 2 minutes, thereby forming films.

Test Example 2

Evaluation of Storage Stability

Each of the inkjet compositions prepared in Examples 1 and 2 and Comparative Examples 1 and 2 was stored at a temperature of 45° C. for 5 days, while a change in the viscosity thereof was measured. When the change in viscosity of the composition during 5 days was 10% or less, the composition was evaluated to have excellent storage stability.

Test Example 3

Evaluation of Transmittance

Each of the inkjet compositions prepared in Examples 1 and 2 and Comparative Examples 1 and 2 was measured for transmittance. The transmittance of each inkjet composition was evaluated by measuring the transmittance of each of the films, manufactured in Test Example 1, at a wavelength of 380-780 nm using an UV absorber. When the transmittance of the transparent coating film after curing was 98% or higher throughout the visible light range, the film was evaluated to have excellent transmittance.

Test Example 4

Evaluation of Heat Resistance

The heat resistance-transmittance and film-remaining rate of each of the inkjet compositions prepared in Examples 1 and 2 and Comparative Examples 1 and 2 were measured for transmittance. The heat resistance was evaluated by additionally heat-treating each of the films, manufactured in Test Example 1, at 250° C. for 40 minutes, and then measuring the transmittance of each film at a wavelength of 380-780 nm using an UV absorber. When the additionally heat-treated transparent coating film had a transmittance of 95% or higher, the film was evaluated to have excellent heat resistance. When the change in thickness of the film between before and after the heat treatment was 15% or less, the film was evaluated to have excellent film-remaining rate.

Test Example 5

Evaluation of Chemical Resistance

The chemical resistance of each of the inkjet compositions prepared in Examples 1 and 2 and Comparative Examples 1 and 2 was measured. The chemical resistance was evaluated by immersing each of the films, manufactured in Test Example 1, in N-methylpyrrolidone (NMP) solution at 40° C. for 30 minutes, and then measuring the rate of swelling of each film. When the rate of swelling of the film was 10% or less, the film was evaluated to have excellent chemical resistance.

Test Example 6

Ink-Jetting Stability

Each of the inkjet compositions prepared in Examples 1 and 2 and Comparative Examples 1 and 2 was evaluated using an inkjet process, in order to examine whether the compositions caused satellites and wetting/drying problems and whether they were normally jetted.

The results of the tests for storage stability, transmittance, heat resistance, chemical resistance and jetting stability are shown in Table 1 below.

able viscosity. Also, these inkjet compositions were normally jetted through all the nozzles, suggesting that they had excellent jetting properties.

However, the inkjet composition according to Comparative Example 2 has high volatility because it contains the low-boiling-point solvent, and also low viscosity. For this reason, it causes satellites and the drying of the nozzle surface, suggesting that the jetting properties thereof are abnormal. Namely, if the viscosity of the ink composition is decreased (e.g., to less than 8 cP), satellites will occur and the ink jetting will be unstable. Also, in the case of the inkjet composition according to Comparative Example 3, because the weight

TABLE 1

|  | Example 1 | Example 2 | Comparative Example 1 | Comparative Example 2 | Comparative Example 3 |
|---|---|---|---|---|---|
| (a):(b) ratio | 1:0.93 | 1:0.93 | 1:1.6 | 1:0.93 | 1:0.4 |
| Solid content (%) | 23.8 | 24.5 | 26 | 24.5 | 25 |
| Viscosity | 12.5 | 11.5 | 12.5 | 5.5 | 18.5 |
| Storage stability | Excellent (change in viscosity <5%) | Excellent (change in viscosity <5%) | Good (change in viscosity <10%) | Excellent (change in viscosity <5%) | Good (change in viscosity <10%) |
| Transmittance after curing | >99% | >99% | >98% | >99% | >99% |
| Heat resistance-transmittance | >98% | >98% | >95% | >98% | >98% |
| Heat resistance-film remaining rate | >85% | >95% | >80% | >95% | >95% |
| Chemical resistance | <15% | <5% | >20% | <5% | <5% |
| Ink-jetting stability | Normal | Normal | Normal | Abnormal | Unstable |
| Remarks | High-boiling-point solvent; thermal curing | High-boiling-point solvent; thermal curing | High-boiling-point solvent; radical polymerization and crosslinking | Low-boiling-point solvent; thermal curing | High-boiling-point solvent; thermal curing; high-viscosity ink |

* (a) binder polymer; (b) polymerizable monomer

As can be seen from the evaluation results in Table 1 above, the inkjet compositions of Examples 1 and 2 according to the present invention showed an increase in viscosity of less than 5% even after storage for 5 days at 45° C., suggesting that these inkjet compositions had very excellent storage stability.

Also, the inkjet compositions of Examples 1 and 2 according to the present invention showed a transmittance of 99% or more over the entire visible-light range after post-baking, suggesting that these compositions had excellent transmittance.

Moreover, unlike the inkjet composition of Comparative Example 1 which is polymerized and crosslinked by carbon-carbon bonds, the inkjet compositions of Examples 1 and 2 according to the present invention showed a transmittance of 98% or more and a film-remaining rate of 85% or more (see Table 1) even additional heat-treatment at 250° C. for 40 minutes, suggesting that these compositions had excellent heat resistance.

Also, unlike the inkjet composition of Comparative Example 1 which is polymerized and crosslinked by carbon-carbon bonds, the inkjet compositions of Examples 1 and 2 according to the present invention showed an increase in thickness of less than 10% upon treatment with the NMP solvent, suggesting that these compositions had excellent chemical resistance.

In addition, the inkjet compositions of Examples 1 and 2 according to the present invention did not cause satellites and wetting/drying problems in the evaluation conducted using the inkjet process, because they had low volatility and suitratio of the binder polymer to the polymerizable monomer is less than 1:0.5, the content of the high-viscosity binder polymer in the ink composition increases, and thus the viscosity of the ink composition is more than 16 cP. As a result, in the case of the inkjet composition of Comparative Example 3, the jetting properties are deteriorated and, at the same time, the surface uniformity of the transparent film is deteriorated, and for this reason, the voltage value required for the normal jetting of the inkjet composition is increased, thus applying an excessive load to the inkjet system. Thus, it can be seen that the inkjet composition of Comparative Example 3 shows unstable jetting properties.

Also, in the case in which the weight ratio of the binder polymer to the polymerizable monomer is less than 1:0.5, like the case of Comparative Example 3, if the viscosity of the inkjet composition is lowered to a suitable level (8-16 cP) in order to overcome unstable jetting properties, there will be a problem in that the efficiency of the inkjet process is reduced. Specifically, in order to reduce the viscosity of the inkjet composition to a suitable level (8-16 cP) while maintaining the weight ratio of the binder polymer to the polymerizable monomer at less than 1:0.5, the solid content of the inkjet composition should be reduced to 20% or less. However, if the solid content of the inkjet composition is reduced, the number of ink drops to be jetted to form an ink film of specific thickness will be disadvantageously increased, thus reducing the efficiency of the inkjet process.

The invention claimed is:

1. An inkjet composition for forming transparent films, comprising:
based on the total weight of the composition,
(a) 1-23.1 wt % of an epoxy group-containing binder polymer;
(b) 1-23.1 wt % of a compound of the following formula 1; and
(c) 75.9-90 wt % of a solvent,
wherein the inkjet composition is used for an inkjet process,
wherein the inkjet composition has a viscosity of 11-13 cP,
wherein the inkjet composition contains neither a pigment nor a coloring agent,
wherein the epoxy group-containing binder polymer (a) is a copolymer of a monomer having an epoxy group with at least one selected from the group consisting of an acrylic monomer having an epoxy group, an acrylic monomer having an ethylenic double bond at the side chain, a (meth)acrylic ester monomer, a styrene monomer, and a silane monomer having an ethylenic unsaturated bond,
wherein the weight ratio of the epoxy group-containing binder polymer (a) to the compound of formula 1 (b) is 1:0.5 to 1:1, and
wherein the solid content of the binder polymer (a) and the compound of formula 1 (b) is 95-99 wt % based on the total solid content of the inkjet composition:

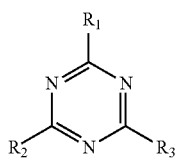

[Formula 1]

wherein at least two of $R_1$, $R_2$ and $R_3$ are amine groups, the remainder of $R_1$, $R_2$ and $R_3$ is hydrogen,
wherein the amine groups are each independently substituted with substituents selected from the group consisting of a $C_1$-$C_{30}$ linear or branched alkyl, a $C_1$-$C_{30}$ linear or branched alkoxy, a $C_3$-$C_{30}$ linear or branched allyl, a $C_2$-$C_{30}$ linear or branched alkenyl, a $C_2$-$C_{30}$ linear or branched vinyl, a carboxyl group (COO—), an ether group (—CH$_2$OR), an alcohol group (—CH$_2$OH), a substituted or unsubstituted $C_3$-$C_{20}$ cycloalkyl, a substituted or unsubstituted $C_6$-$C_{40}$ aryl, a substituted or unsubstituted $C_7$-$C_{15}$ aralkyl, and a $C_7$-$C_{15}$ alkylaryl substituted or unsubstituted with hydrocarbon,
and when the substituents of the amine groups are substituted with different substituents, the different substituents are selected from the group consisting of a $C_1$-$C_{30}$ alkyl group, a $C_6$-$C_{40}$ aryl group, a $C_3$-$C_{40}$ heterocyclic group, and a halogen group.

2. The inkjet composition of claim 1, wherein the compound of formula 1 is a compound of the following formula 2:

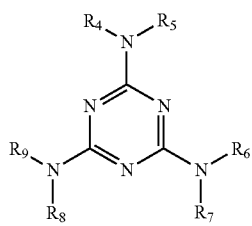

[Formula 2]

wherein $R_4$ to $R_9$ are each independently selected from the group consisting of a $C_1$-$C_{30}$ linear or branched alkyl, a $C_1$-$C_{30}$ linear or branched alkoxy, a $C_3$-$C_{30}$ linear or branched allyl, a $C_2$-$C_{30}$ linear or branched alkenyl, a $C_2$-$C_{30}$ linear or branched vinyl, a carboxyl group (COO—), an ether group (—CH$_2$OR), an alcohol group (CH$_2$OH), a substituted or unsubstituted $C_3$-$C_{20}$ cycloalkyl, a substituted or unsubstituted $C_6$-$C_{40}$ aryl, a substituted or unsubstituted $C_7$-$C_{15}$ aralkyl, and a $C_7$-$C_{15}$ alkylaryl substituted or unsubstituted with hydrocarbon,
and when $R_4$ to $R_9$ are substituted with different substituents, the substituents are selected from the group consisting of a $C_1$-$C_{30}$ alkyl group, a $C_6$-$C_{40}$ aryl group, a $C_3$-$C_{40}$ heterocyclic group, and a halogen group.

3. The inkjet composition of claim 1, wherein the inkjet composition has a three-dimensional network structure.

4. The inkjet composition of claim 1, wherein the content of the monomer, having the epoxy group, in the copolymer, is 5-50 wt % based on the total weight of the copolymer.

5. The inkjet composition of claim 1, wherein the epoxy group-containing binder polymer (a) has a weight-average molecular weight of 1,000-100,000.

6. The inkjet composition of claim 1, wherein the solvent (c) has a boiling point of 150~250° C.

7. A transparent film formed using the inkjet composition of claim 1.

8. The transparent film of claim 7, wherein the transparent film has a light transmittance of 98% or higher at 380-780 nm after curing.

9. An electronic device comprising the transparent film of claim 7 as an overcoat.

10. A color filter comprising the transparent film of claim 7 as a white pattern.

11. A method for manufacturing a transparent film, the method comprising forming the transparent film with the inkjet composition of claim 1 using an inkjet process.

12. A method for preparing an inkjet composition for forming transparent films, the method comprising mixing (a) 1-23.1 wt % of a binder polymer containing an epoxy group, (b) 1-23.1 wt % of a compound of the following formula 1 and (c) 75.9-90 wt % of a solvent, based on the total weight of the composition,
wherein the inkjet composition has a viscosity of 11-13 cP,
wherein the inkjet composition contains neither a pigment nor a coloring agent,
wherein the epoxy group-containing binder polymer (a) is a copolymer of a monomer having an epoxy group with at least one selected from the group consisting of an acrylic monomer having an epoxy group, an acrylic monomer having an ethylenic double bond at the side chain, a (meth)acrylic ester monomer, a styrene monomer, and a silane monomer having an ethylenic unsaturated bond,
wherein the weight ratio of the epoxy group-containing binder polymer (a) to the compound of formula 1 (b) is 1:0.5 to 1:1, and
wherein the solid content of the binder polymer (a) and the compound of formula 1 (b) is 95-99 wt % based on the total solid content of the inkjet composition:

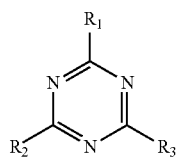

[Formula 1]

wherein at least two of $R_1$, $R_2$ and $R_3$ are amine groups, the remainder of $R_1$, $R_2$ and $R_3$ is hydrogen, wherein the amine groups are each independently substituted with substituents selected from the group consisting of a $C_1$-$C_{30}$ linear or branched alkyl, a $C_1$-$C_{30}$ linear or branched alkoxy, a $C_3$-$C_{30}$ linear or branched allyl, a $C_2$-$C_{30}$ linear or branched alkenyl, a $C_2$-$C_{30}$ linear or branched vinyl, a carboxyl group (COO—), an ether group (—$CH_2OR$), an alcohol group (—$CH_2OH$), a substituted or unsubstituted $C_3$-$C_{20}$ cycloalkyl, a substituted or unsubstituted $C_6$-$C_{40}$ aryl, a substituted or unsubstituted $C_7$-$C_{15}$ aralkyl, and a $C_7$-$C_{15}$ alkylaryl substituted or unsubstituted with hydrocarbon, and wherein when the substituents of the amine groups are substituted with different substituents, the different substituents are selected from the group consisting of a $C_1$-$C_{30}$ alkyl group, a $C_6$-$C_{40}$ aryl group, a $C_3$-$C_{40}$ heterocyclic group, and a halogen group.

\* \* \* \* \*